(12) United States Patent
Kaiser et al.

(10) Patent No.: US 9,164,752 B2
(45) Date of Patent: Oct. 20, 2015

(54) AUTOMATIC TRAINING PROPOSAL BASED ON SOFTWARE UPDATE ERRORS

(71) Applicants: Martin Kaiser, Speyer (DE); Udo Klein, Maximiliansau (DE); Michael Wagener, Wiesloch (DE); Oliver Knaup, Heidelberg (DE); Michael Segler, Wiesloch (DE)

(72) Inventors: Martin Kaiser, Speyer (DE); Udo Klein, Maximiliansau (DE); Michael Wagener, Wiesloch (DE); Oliver Knaup, Heidelberg (DE); Michael Segler, Wiesloch (DE)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 13/716,664

(22) Filed: Dec. 17, 2012

(65) Prior Publication Data

US 2014/0173362 A1    Jun. 19, 2014

(51) Int. Cl.
*G06F 11/00* (2006.01)
*G06F 9/445* (2006.01)

(52) U.S. Cl.
CPC ........................................ *G06F 8/65* (2013.01)

(58) Field of Classification Search
CPC .............. G06F 11/0748; G06F 11/079; G06F 11/3476; G06F 8/34; G06F 11/0751; G06F 11/0793; G06F 11/1482; G06F 11/1683; G06F 11/1687; G06F 11/2257; G06F 17/3089; G06F 2201/88; G06F 9/3851; G06F 9/3885; G06F 11/3409; G06F 11/3485
USPC ........................................................ 714/47.2
See application file for complete search history.

(56) References Cited

U.S. PATENT DOCUMENTS

| 7,287,076 | B2 * | 10/2007 | Ewanchuk et al. | 709/224 |
| 7,865,888 | B1 * | 1/2011 | Qureshi et al. | 717/168 |
| 2002/0087345 | A1 * | 7/2002 | Bly et al. | 705/1 |
| 2006/0053075 | A1 * | 3/2006 | Roth et al. | 705/50 |

\* cited by examiner

*Primary Examiner* — Bryce Bonzo
*Assistant Examiner* — Elmira Mehrmanesh
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for proposing training based on the prediction or measurement of different metrics associated with a transport request. In one aspect there is provided a method that may include preparing a transport request including one or more objects configured to provide an update of an application. The transport request may be associated with one or more metrics, each metric having a metric value. The method may also include determining whether the transport request includes at least one error by at least evaluating the metric value for each of the one or more metrics and comparing the metric value for each of the metrics with a threshold value; and proposing, based on the determining, at least one training course when the transport request includes the at least one error. Related systems, apparatus, methods, and/or articles are also described.

23 Claims, 4 Drawing Sheets

AUTOMATIC TRAINING PROPOSAL BASED ON SOFTWARE UPDATE ERRORS

TECHNICAL FIELD

This disclosure relates generally to data processing and, more particularly, to the proposal of a training course based on a transport request.

BACKGROUND

It is increasingly common for a system to operate not alone but as part of a more complex system landscape. Indeed, business processes currently run on systems of dissimilar types. In order to accommodate changes to business processes, the software used to configure these systems may change frequently. These software changes may, for example, fix existing software bugs, provide software updates, or provide new functionality. When these software changes are ready to be released, a transport manager transports or deploys these changes to various systems using a transport request. Transporting these changes, however, may adversely impact the system if, for example, the content of the transport request is incorrect. Doing so may result in system downtime, data loss, or damage to an application or process running on the system.

SUMMARY

In some implementations, methods and apparatus, including computer program products, are provided for proposing training based on the prediction or measurement of different metrics associated with a transport request.

In some implementations, there is a provided a non-transitory computer-readable medium. The non-transitory computer-readable medium may contain instructions to configure a processor to perform operations. In some implementations, these operations may include preparing a transport request including one or more objects configured to provide an update of an application; determining whether the transport request includes at least one error by at least evaluating the metric value for each of the one or more metrics and comparing the metric value for each of the one or metrics with a threshold value; and proposing, based on the determining, at least one training course when the transport request includes the at least one error. In some implementations, the transport request may be associated with one or more metrics, each of the one or more metrics having a metric value.

The above methods, apparatus, and computer program products may, in some implementations, further include one or more of the following features.

In some implementations, the transport request may represent a container carrying the update from a first system to a second system. In some implementations, the one or more objects in the transport request may include one or more of the following: data for the update of the application and software for the update of the application. In still other implementations, the second system may comprise a production system that updates the application with the one or more objects in the transport request.

In some implementations, each of the one or more metrics may include a metric type that corresponds to one or more software update error categories. These software categories may include one or more of a syntax error, an activation error, an integration error, and a test case error. In some implementations, the at least one proposed training course may be selected based on the metric type.

With regard to the evaluating of the metric value for each of the one or more metrics, the evaluating may include simulating the update of the application with the one or more objects included in the transport request; determining the metric value for each of the one or more metrics; and identifying the at least one error in the simulated update based on the determined metric value. In some implementations, a developer associated with the at least one error may be identified, and the at least one proposed training course may be provided to the identified developer.

With regard to the evaluating of the metric value for each of the one or more metrics, the evaluating may, in some implementations, include predicting the metric value before the transport request is sent from a first system to a second system. In some implementations, the second system may include at least one of a production system or a quality assurance system.

With regard to the evaluating of the metric value for each of the one or more metrics, the evaluating may, in some implementations, include measuring the metric value after the transport request is implemented or after a scheduled event.

With regard to the predicting of the metric value before the transport request is sent from a first system to a second system, the predicting may, in some implementations, include assigning a risk score using historical data gathered from one or more former transport requests. In other implementations, the predicting may include assigning a quality rating based on a period of time during which the metric value does not change. With regard to these quality ratings, a fixed quality rating is assigned if the metric value does not change. In still other implementations, the predicting may include predicting a runtime associated with the metric value.

In some implementations, the transport request may include at least one error when the metric value is greater than the threshold value. In some implementations, the threshold value may include a predefined value based on historical data in one or more former transport requests. In some implementations, the comparing may include using a threshold value having the same metric type as the metric value.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

Transport requests may be used to supply software changes to various systems operating within a system landscape. If the contents of the transport request are incorrect, problems including system downtime, runtime damages, and the like may impact a receiving system. These errors generally arise when inexperienced personnel send transport requests with erroneous software objects which may include, for example, an erroneous update to an application. In order to reduce the recurrence of these problems, the subject matter disclosed herein may propose a training course relevant to the error to the responsible personnel. This proposal may be based on various metrics associated with the transport request.

Figure 1:
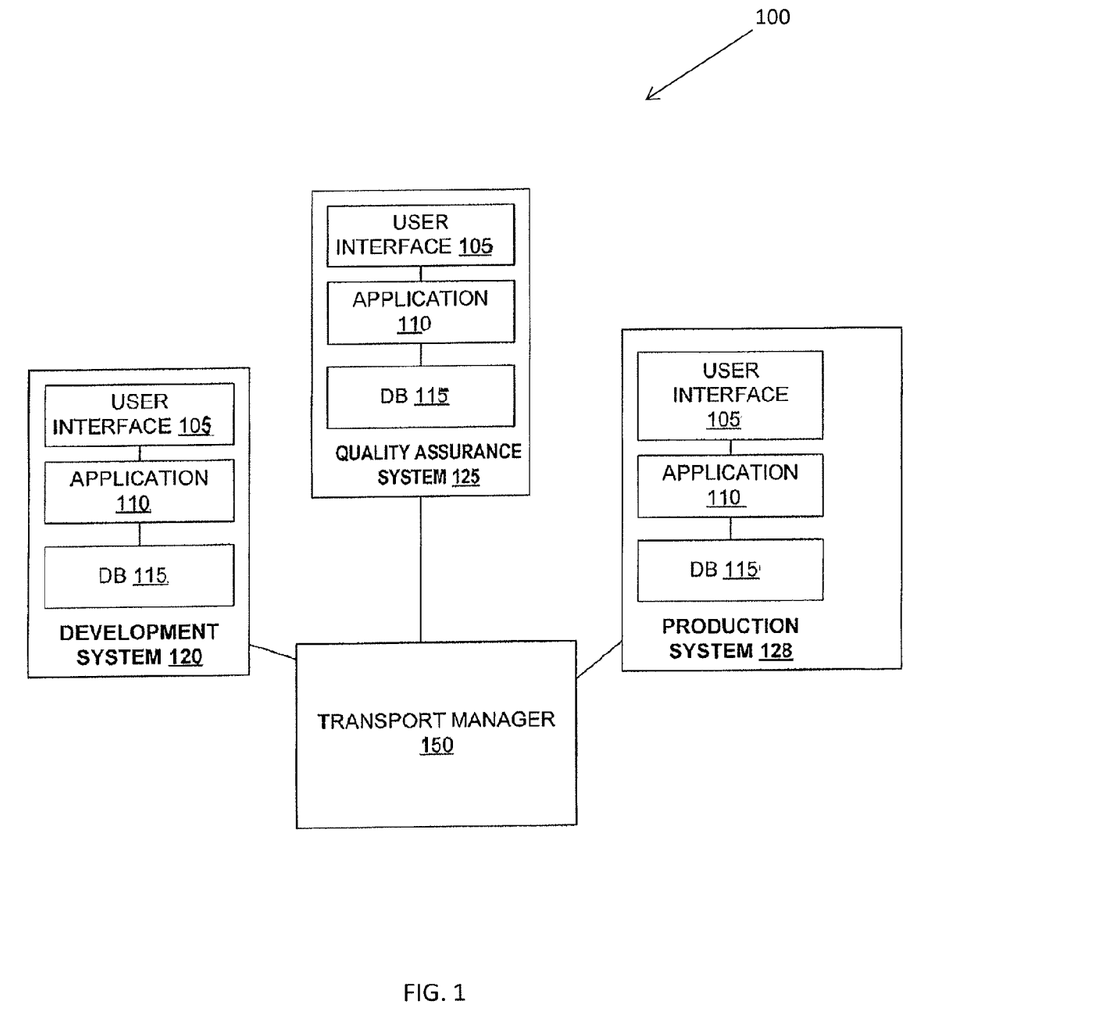
FIG. 1 illustrates a system for supplying software updates, in accordance with some example implementations.

FIG. 1 depicts a system landscape 100 including a development system 120, a quality assurance system 125, a production system 128, and a transport manager 150. System landscape 100 depicts a three-tier framework used to develop, test, and deploy computer-implemented software, although other frameworks may be used as well.

The development system 120 further includes a user interface 105, one or more applications 110, and a database 115, all of which are coupled by a communication mechanism, such as an intranet or the Internet. User interface 105 may be implemented as any type of interface mechanism for a user, such as a web browser, a client, a smart client, and any other presentation mechanism. Database 115 (labeled "DB") may be implemented as any type of database.

The one or more applications 110 may be implemented as any type of program. Moreover, one or more of these applications 110 may be undergoing a so-called "update." The term "update" refers to changes or additions to programs (e.g., applications, operating systems, data, and the like) used at systems 120, 125, and 128. For example, an update may provide a revision to software and data, both of which are associated with an application at one or more of the systems 120, 125, and 128.

Development system 120 is further coupled, via a communication mechanism, to transport manager 150, and has access to an interface at, for example, transport manager 150. The interface is accessed to execute transport requests (also referred to as containers) from and to the development system 120.

Quality assurance (QA) system 125 and production system 128 possess features similar to those described above with respect to development system 120. These features include user interface 105, application 110, and database 115. Both quality assurance system 125 and production system 128 are further coupled, via a communication mechanism, to transport manager 150, and have access to an interface at, for example, transport manager 150. The interface is accessed to execute transport requests (also referred to as containers) from and to quality assurance system 125 and from and to production system 128.

Transport manager 150 may be implemented as one or more data processors, such as a server, computer, blade, and the like, and may include a so-called "transport layer" of software to manage and route containers including software updates (packaged in a container with software objects). Moreover, transport manager 150 manages software updates including the proper routing of software updates to a corresponding application. Although FIG. 1 depicts the transport manager 150 as separate from systems 120, 125, and 128, the transport manager 150 may be distributed across one or more of the systems 120, 125, and 128.

In some implementations, a developer may use development system 120 to generate software updates (e.g., using user interface 105 in development system 120 to identify and/or generate which software objects will be part of the container to provide a software update to applications and systems). Once developed, the user may access an interface at the transport manager 150 to execute a container for routing the generated software updates to the correct systems and/or applications. For example, the transport manager 150 may generate a transport route between development system 120, which includes a container having software objects, and quality assurance system 125, where the update comprising software objects is tested. Transport manager 150 may send a transport request that includes this container along the generated transport route. When testing is complete, the user may access an interface at the transport manager 150 to indicate that testing is complete. In response, the transport manager 150 may send another transport request along a newly generated transport route between quality assurance system 125 and the production system 128. The production system 128 represents the final, so-called "live" system on which the generated software updates will be deployed and thus executed.

Problems may arise when a transport request is transported. These problems may adversely impact the receiving system and may stem from problems with the transport request itself. For example, development objects in the request may contain major defects like database inconsistencies, syntax errors, and the like. These problems may cause serious problems including, for example, system downtime or damage to an application or process running on the receiving system.

These errors may arise when inexperienced personnel send erroneous transport requests or erroneous development objects. In order to reduce the recurrence of these problems, training courses relevant to the error may be recommended to the responsible personnel. For example, if an employee sends a transport request that results in system downtime, metrics associated with the request may be predicted or measured to determine the cause of the interruption. If the downtime occurs, for example, because the transport request contains too many software objects, then training regarding the development process (e.g., dividing the transport request into multiple smaller requests) may be recommended to the employee.

Figure 2:
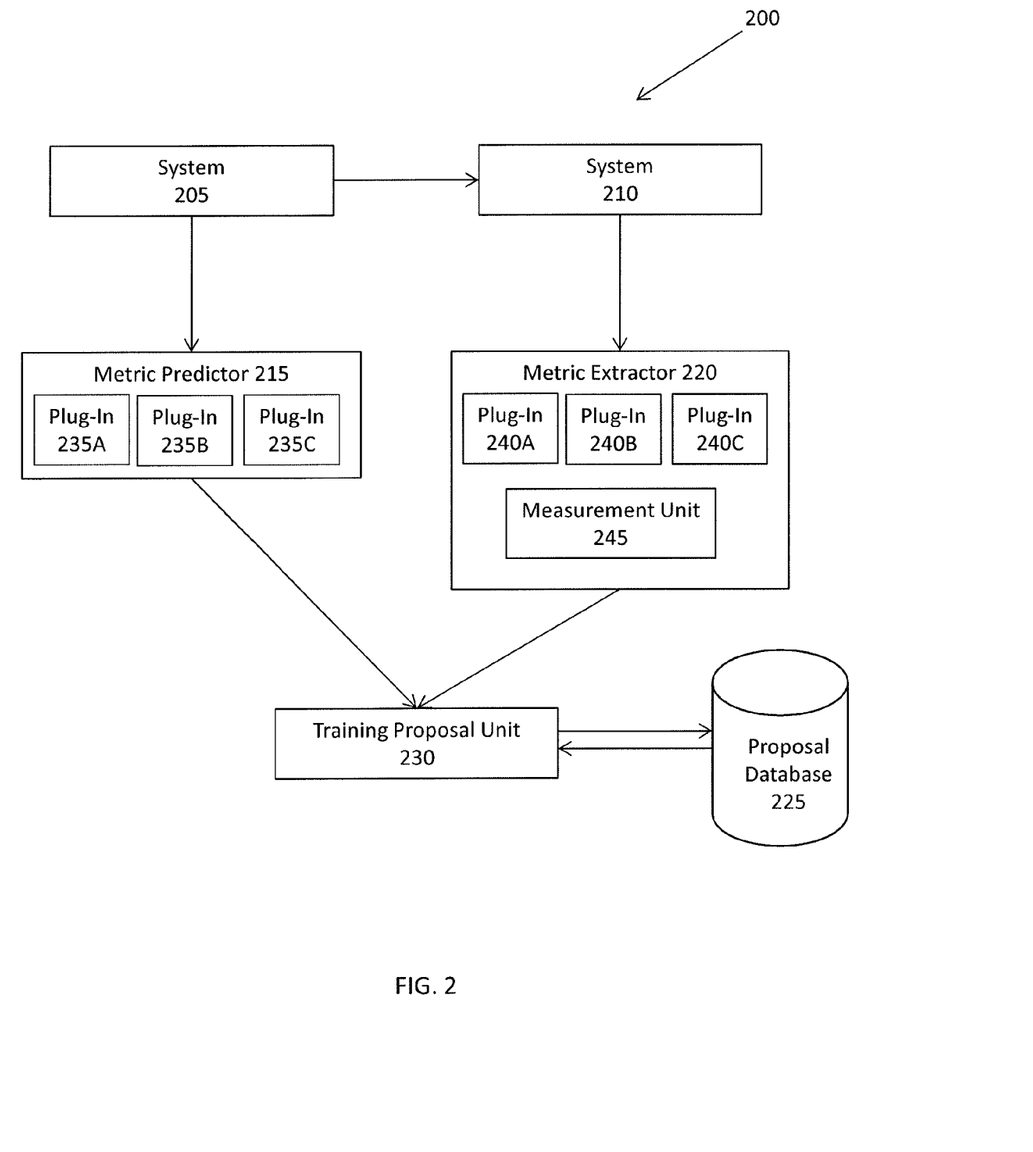
FIG. 2 illustrates a system for proposing a training course to an employee, in accordance with some example implementations.

FIG. 2 illustrates a system 200 for proposing a training course to an employee. Process 200 begins when an employee using system 205 prepares a transport request containing, for example, a software update, that is designated for system 210. A transport manager 150 may send this transport request to system 210. As mentioned above, this transport request may adversely impact system 210. Process 200 may assess this impact by predicting the values of various metrics associated with the transport request using metric predictor 215. Alternatively, process 200 may assess this impact by directly measuring the value of these metrics using metric extractor 220. Metrics represent different features associated with the software objects in the transport request. Accordingly, the evaluation of these metrics, either by prediction or measurement, may involve the evaluation of the underlying software objects in the transport request. Metric predictor 215 and metric extractor 220 are described in further detail below.

Metric predictor 215 may use plug-ins 235A, 235B, and 235C to predict the values of various metrics associated with a transport request without requiring the transport request to take effect. These predictions may be based on a simulated transport request. Metric predictor 215 may be implemented as one or more data processors such as a server, computer, and the like. Plug-ins 235A, 235B, and 235C may be implemented as a set of static functions that make metric predictions by analyzing the software objects contained in the transport request. The plug-ins may examine the risk associated with the transport request, the quality of the transport request, and the runtime associated with the transport request. Other metrics may be predicted including, for example, those described below with respect to metric extractor 220. Although metric predictor 215 is illustrated as having three plug-ins, other quantities of plug-ins may be implemented as well.

In order to evaluate the risk associated with a transport request, metric predictor 215 may use plug-in 235A to tag frequently used objects in the transport request and assign a risk score to these objects. These objects may include those that are frequently referenced, frameworks that are frequently used, basic libraries, critical objects, and/or any other data/code. Critical objects may represent those objects causing severe problems when not functioning properly (e.g., after-import methods, database tables, and the like). Plug-in 235A may be configured to assign a risk score to these tagged objects using historical data gathered from former transport requests. In some implementations, a high risk score may represent a greater risk of a failure or fault to a system than a low risk score. Metric predictor 215 may also be configured to send the predicted risk values for tagged objects in the transport request to training proposal unit 230.

In order to evaluate the quality of a transport request, metric predictor 215 may use plug-in 235B to estimate the period of time that objects in the transport request remain unchanged. This estimate may vary widely depending on the object type. For objects that do not change (e.g., documentation, text elements, and the like), plug-in 235B may assign a fixed quality rating. For objects that change frequently (e.g., data elements), the associated quality rating may vary. Frequent changes to an object may indicate instability and thus result in a low quality rating. Objects that remain relatively constant may have a high quality rating. Plug-in 235B may shift these quality ratings up or down depending on various factors including, for example, the number of changes to an object in a predefined period of time (e.g., number of changes within the last 2 months), the magnitude of the change, whether the change was made to previously reviewed software code, whether follow-up review was conducted after the change, and/or any other factor providing an indication of object stability. Metric predictor 215 may be configured to send the predicted quality ratings for the objects in the change request to training proposal unit 230.

Predictor module 215 may use plug-in 235C to predict the runtime associated with a transport request by analyzing the objects contained within the request. Each object type may be associated with either a fixed runtime time or a coded exit. In one implementation, the coded exit may evaluate the number of data lines to be adjusted in a customer system. In another implementation, the coded exit may evaluate the number of dependent objects that need to be updated during the import step. A dependent object is a development object that is used by a base object. For example, a database table may be a dependent object of a program that uses the database table. The import step may be time consuming if, for example, the base object has a large number of dependent objects. Runtime values and coded exit values may be based on historical data from former transport requests or software updates. For simple object types, like a text element, the predicted runtime may be a fixed value that corresponds to the runtime of the import step. For more complicated objects, like data elements, the predicted runtime may be based on the number of dependent objects that are invalidated. A dependent object may be invalidated when changes to the base object necessitate changes to the dependent object. This may occur, for example, when a data type that is used by various line types and programs is changed. Changes to the data type may necessitate changes to the line types and any databases or programs that use the changed data type. Metric predictor 215 may send the predicted runtime values for the objects in the transport request to training proposal unit 230.

Distinct from metric predictor 215 which predicts metric values associated with a transport request, metric extractor 220 may measure these values. Metric extractor 220 may have a set of plug-ins 240A, 240B, and 240C that may be implemented as a set of static functions. Plug-ins 240A, 240B, and 240C may be triggered after a transport request has taken effect or after completion of a scheduled event, such as a recurring job. When triggered, plug-ins 240A, 240B, and 240C may make various metric measurements using measurement unit 245. These metric measurements may include, for example, the number of invalid entities associated with an incorrect transport request and the associated cost, the downtime associated with the transport request during which the system is not usable, the runtime associated with the transport request, the status of a database before and after a change request has taken effect, the number of syntax errors caused by the transport request, the amount of data lost due to an incorrect transport request, the number and type of applications or processes that are broken because of the transport request, and any other metric that may be measured by plug-ins 235A, 235B, and 235C. Moreover, although metric extractor 220 is illustrated as having three plug-ins, other quantities of plug-ins may be used as well. Metric extractor 220 may be configured to send these measured metric values to training proposal unit 230.

In some example implementations, training proposal unit 230 may receive predicted and measured metric values from metric predictor 215 and metric extractor 220, respectively, and determine a training proposal. For example, training proposal unit 230 may, based on a table, such as table 300 illustrated in FIG. 3, compare the received values against threshold values.

Figure 3:
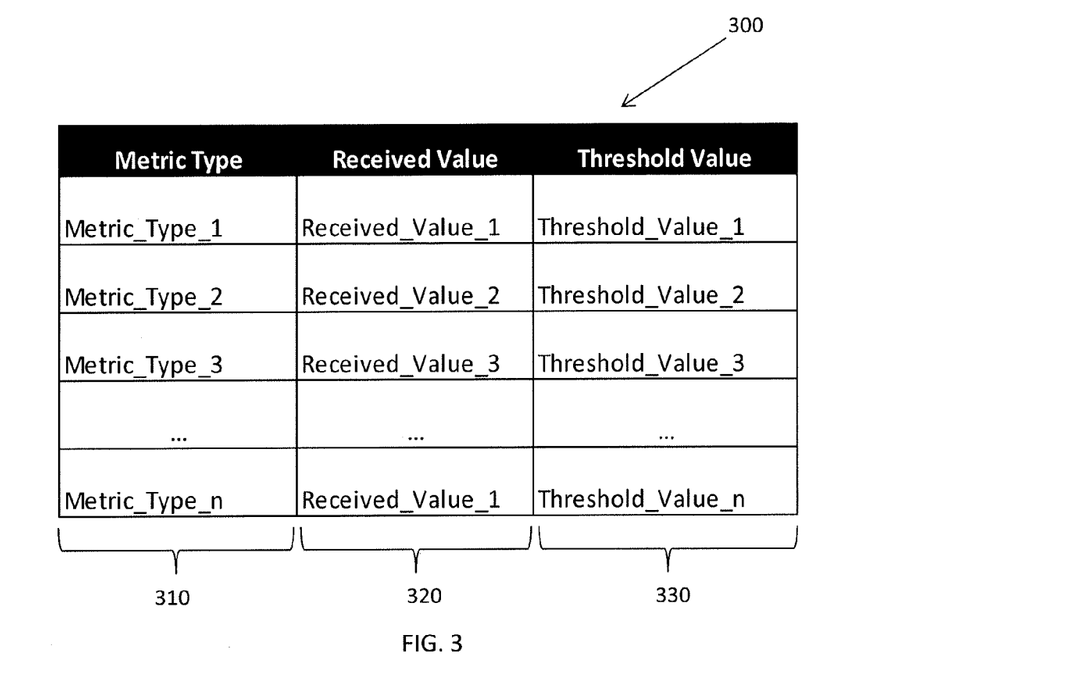
FIG. 3 is a table of features associated with a metric, in accordance with some example implementations.

Referring to FIG. 3, table 300 is divided into multiple rows and columns. Each row in table 300 may represent data associated with a received metric value. The columns of table 300 may represent different details about the received metric value including, for example, the metric type 310, the received value 320 (either measured or predicted), and the threshold value 330. Threshold values 330 have the same metric type as the received values, and these values may be predefined based on historical data in former transport requests. If the received metric value is greater than the threshold value, then training proposal unit 230 may send metric type 310 to proposal database 225 to obtain an appropriate training course. Metric type 310 may correspond to an error category associated with the software objects in the transport request. For example, if the number of software objects in a transport request exceeds a threshold value, then a training course may be proposed based on the category of the error (e.g., training related to the appropriate number of software objects in a transport request).

Proposal database 225 may hold records associated with available training courses. Each of these training courses may be associated with a particular training identifier (ID) and training description. Using table 400 illustrated in FIG. 4, proposal database 225 may propose a training course by mapping received metric type 310 into a training ID 420 and a corresponding training description 430. The information shown in table 400 may be manually compiled by experts who are responsible for defining the various metric types, their threshold values, and the corresponding training proposals. The mapping performed by table 400 may associate the received metric type to one or more training courses in a corresponding area. For example, if metric type 310 is associated with a database metric that exceeds a threshold value, then proposal database 225 may return a training ID 420 and training description 430 for a training course relating to databases. In another example, if metric type 310 is associated with a broken customer relationship management (CRM) process, then proposal database 225 may return a training ID 420 and training description 430 relating to CRM processes to prevent the responsible party from breaking the CRM process again.

Figure 4:
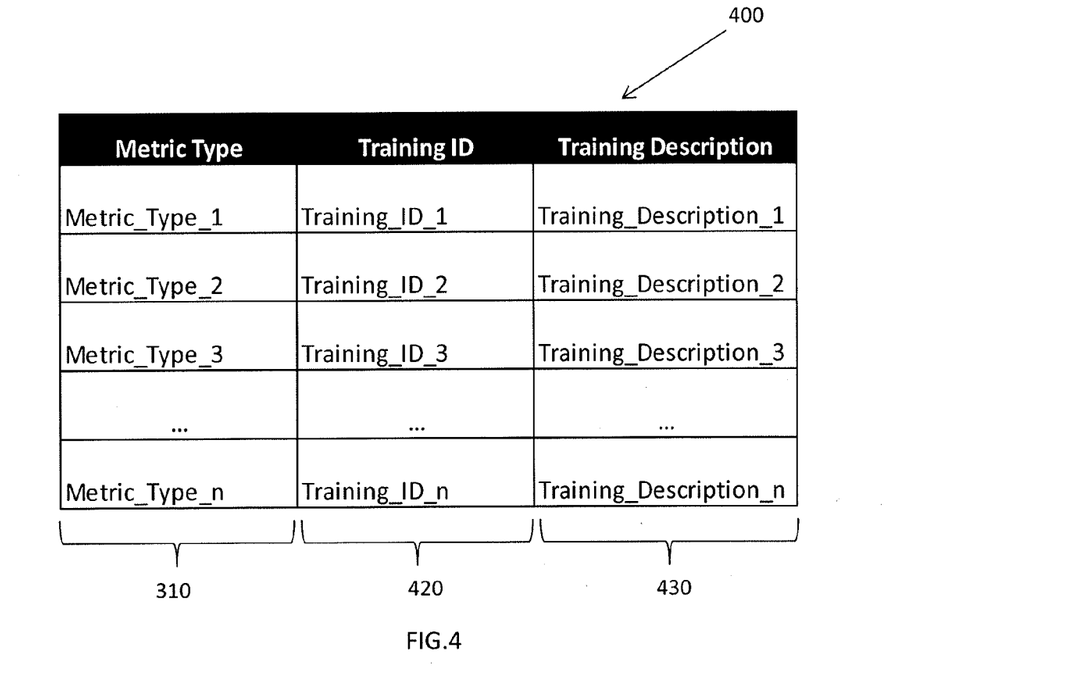
FIG. 4 is a table that maps a metric type to a training ID and training description, in accordance with some example implementations.

Proposal database 225 may send training ID 420 and training description 430 back to training proposal unit 230 which, in turn, may present this information to the responsible party. Although table 400 is illustrated as mapping each metric type 310 to a single training ID 420, metric type may also be associated with multiple training IDs as well.

Figure 5:
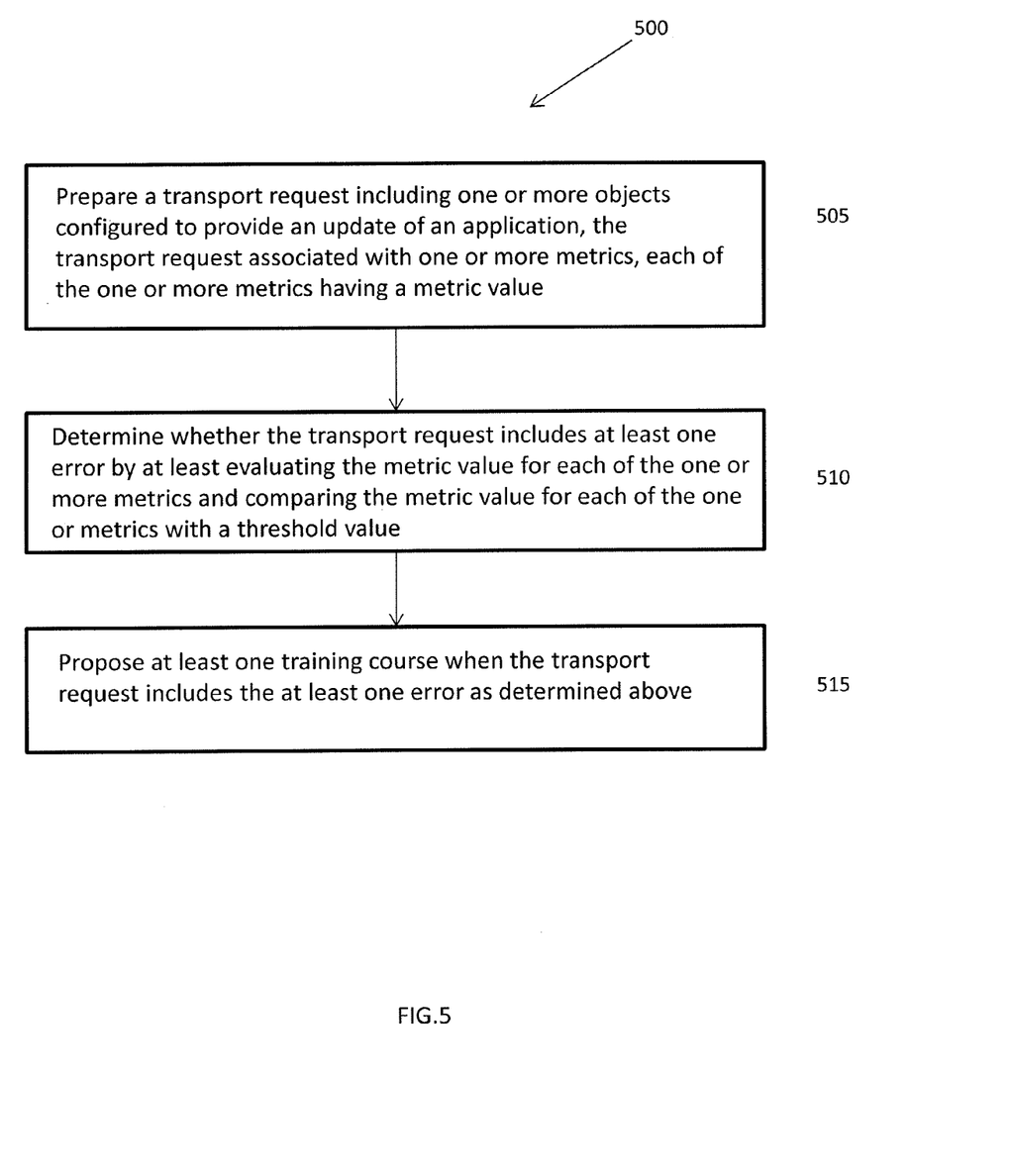
FIG. 5 illustrates a process for generating training proposals, in accordance with some example implementations.

FIG. 5 illustrates a process 500 for proposing a training course. The description of process 500 also refers to FIGS. 1-4.

At 505, a transport request may be prepared. In some implementations, a software developer may use a first system 205, such as a development system 120, to generate this transport request. This transport request may include one or more objects that may be configured to provide an update of an application at a second system 210, such as a quality assurance system 125 or a production system 128. These objects may include data as well as software for the update of the application at the second system. The update may comprise a change, a replacement, and/or an addition to the software, data, and any other aspect of the application at the second system.

The transport request may be associated with one or more metrics. These metrics may represent different features associated with the transport request including, for example, the risk associated with the transport request, the quality of the transport request, the downtime and/or runtime associated with the transport request, the number of invalid entities associated with an incorrect transport request, and the like. Each of these metrics may be further associated with a metric value. The metric value may be a numerical value evaluated at 510.

In some implementations, each metric may be further associated with a metric type. The metric type may correspond to a software update error category that is associated with the objects in the transport request. For example, if the number of software objects in a transport request exceeds a threshold value, then a training course may be proposed based on the category of the software update error (e.g., training related to the appropriate number of permissible software objects in a transport request). Other software update error categories include syntax errors associated with the software objects in the transport request, activation errors detected at runtime or predicted with the software objects in the transport request (e.g., can the software objects be implemented/executed), integration errors including failures (e.g., are the software objects compatible with the target system environment), test case error, and the like.

At 510, it may be determined whether any errors are present in the transport request. This determination may be made by evaluating the metric value for each of the metrics and comparing the metric value with a threshold value. Both of these steps are described below.

With regard to the evaluation of the metric value, in some implementations, metric predictor 215 may perform this evaluation by predicting the metric value (e.g., before transport of the transport request from system 205 to system 210) using plug-ins 235A, 235B, and 235C.

In some implementations, this evaluation/prediction may be based on a simulated update of an application using a simulated transport request. This simulated update may be performed by simulating the transport of a software update from a first system 205 to a second system 210 and evaluating the results of the simulation. Like the transport requests described above, a simulated transport request may be associated with one or more metrics. A value for each of these metrics may be determined using, for example, historical data gathered from former transport requests. These former transport requests may be selected based on the similarity of their underlying software objects with the software objects in the simulated transport request.

Alternatively, or in addition to the evaluation/prediction mechanisms described above, metric extractor 220 may perform this evaluation by measuring the metric values (e.g., after transport of the transport request from system 205 to system 210) using plug-ins 240A, 240B, and 240C and measurement unit 245

Each of these metric values may be compared to a threshold value at 510 to determine whether an error is present. Error determination may be based on metric values associated with either an actual or simulated transport request. An error may be present if the metric value determined at 510 is larger than a threshold value. For example, if the runtime of a transport request is larger than a threshold runtime, then an error may be present. In some implementations, table 300 may be used to perform this comparison.

At 515, one or more training courses may be proposed if the transport request has an error. The training course may take a variety of forms including video training, web-based training, and the like. In order to propose a training course that is relevant to the error, proposal database 225 may base its proposal on the metric type associated with the metric value evaluated at 510. For example, if the comparison at 510 reveals that an actual or simulated transport request results in system downtime (i.e., the metric type) having a duration (i.e., the metric value) that exceeds a threshold value, then proposal database 225 may propose a training course in a software update error category relevant to system downtime (i.e., the metric type). In some implementations, proposal database 225 may use table 400 to map the corresponding metric type to a training course and provide the proposed training course to the developer responsible for the error. The responsible developer may be identified based on his/her involvement with the preparation of the software objects included in the transport request.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A non-transitory computer-readable medium containing instructions to configure a processor to perform operations comprising:
   preparing a transport request including one or more objects configured to provide an update of an application, the transport request associated with one or more metrics, each of the one or more metrics having a metric value;
   determining whether the transport request includes at least one error by at least evaluating the metric value for each of the one or more metrics and comparing the metric value for each of the one or metrics with a threshold value; and
   proposing, based on the determining, at least one training course when the transport request includes the at least one error,
   wherein the evaluating the metric value includes predicting the metric value before the transport request is sent from a first system to a second system, and
   wherein the predicting the metric value includes assigning a quality rating based on a period of time during which the metric value does not change.

2. The non-transitory computer-readable medium of claim 1,
   wherein the transport request represents a container carrying the update from the first system to the second system,
   wherein the one or more objects include one or more of the following: data for the update of the application and software for the update of the application, and
   wherein the second system comprises a production system that updates the application with the one or more objects in the transport request.

3. The non-transitory computer-readable medium of claim 1, wherein each of the one or more metrics includes a metric type that corresponds to one or more software update error categories.

4. The non-transitory computer-readable medium of claim 3, wherein the one or more software update error categories include one or more of a syntax error, an activation error, an integration error, and a test case error.

5. The non-transitory computer-readable medium of claim 3, wherein the at least one proposed training course is selected based on the metric type.

6. The non-transitory computer-readable medium of claim 5, further comprising:
   identifying a developer associated with the at least one error; and
   providing the at least one proposed training course to the identified developer.

7. The non-transitory computer-readable medium of claim 3, wherein the comparing includes using the threshold value having the same metric type as the metric value.

8. The non-transitory computer-readable medium of claim 1, wherein the evaluating comprises:
   simulating the update of the application with the one or more objects included in the transport request;
   determining the metric value for each of the one or more metrics; and
   identifying the at least one error in the simulated update based on the determined metric value.

9. The non-transitory computer-readable medium of claim 1, wherein the second system comprises at least one of a production system or a quality assurance system.

10. The non-transitory computer-readable medium of claim 9, wherein the predicting the metric value includes assigning a risk score using historical data gathered from one or more former transport requests.

11. The non-transitory computer-readable medium of claim 9, wherein the predicting the metric value includes predicting a runtime associated with the metric value.

12. The non-transitory computer-readable medium of claim 1, wherein the evaluating the metric value includes measuring the metric value after the transport request is implemented or after a scheduled event.

13. The non-transitory computer-readable medium of claim 1, wherein a fixed quality rating is assigned if the metric value does not change.

14. The non-transitory computer-readable medium of claim 1, wherein the transport request includes the at least one error when the metric value is greater than the threshold value.

15. The non-transitory computer-readable medium of claim 1, wherein the threshold value comprises a predefined value based on historical data in one or more former transport requests.

16. A system comprising:
a processor; and
a memory, wherein the processor and the memory are configured to perform a method comprising:
preparing a transport request including one or more objects configured to provide an update of an application, the transport request associated with one or more metrics, each of the one or more metrics having a metric value;
determining whether the transport request includes at least one error by at least evaluating the metric value for each of the one or more metrics and comparing the metric value for each of the one or metrics with a threshold value; and
proposing, based on the determining, at least one training course when the transport request includes the at least one error,
wherein the evaluating the metric value includes predicting the metric value before the transport request is sent from a first system to a second system, and
wherein the predicting the metric value includes assigning a quality rating based on a period of time during which the metric value does not change.

17. The system of claim 16, wherein each of the one or more metrics includes a metric type that corresponds to one or more software update error categories.

18. The system of claim 16, wherein the transport request represents a container carrying the update from the first system to the second system,
wherein the one or more objects include one or more of the following: data for the update of the application and software for the update of the application, and
wherein the second system comprises a production system that updates the application with the one or more objects in the transport request.

19. The system of claim 16, wherein the evaluating comprises:
simulating the update of the application with the one or more objects included in the transport request;
determining the metric value for each of the one or more metrics; and
identifying the at least one error in the simulated update based on the determined metric value.

20. A method comprising:
preparing a transport request including one or more objects configured to provide an update of an application, the transport request associated with one or more metrics, each of the one or more metrics having a metric value;
determining whether the transport request includes at least one error by at least evaluating the metric value for each of the one or more metrics and comparing the metric value for each of the one or metrics with a threshold value; and
proposing, based on the determining, at least one training course when the transport request includes the at least one error,
wherein the evaluating the metric value includes predicting the metric value before the transport request is sent from a first system to a second system, and
wherein the predicting the metric value includes assigning a quality rating based on a period of time during which the metric value does not change.

21. The method of claim 20, wherein each of the one or more metrics includes a metric type that corresponds to one or more software update error categories.

22. The method of claim 20, wherein the transport request represents a container carrying the update from the first system to the second system,
wherein the one or more objects include one or more of the following: data for the update of the application and software for the update of the application, and
wherein the second system comprises a production system that updates the application with the one or more objects in the transport request.

23. The method of claim 20, wherein the evaluating comprises:
simulating the update of the application with the one or more objects included in the transport request;
determining the metric value for each of the one or more metrics; and
identifying the at least one error in the simulated update based on the determined metric value.

* * * * *